(12) United States Patent
Dunn et al.

(10) Patent No.: US 7,434,060 B2
(45) Date of Patent: *Oct. 7, 2008

(54) SECURE ENTRY OF A USER-IDENTIFIER IN A PUBLICLY POSITIONED DEVICE

(75) Inventors: James M. Dunn, Fresno, CA (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

This patent is subject to a terminal disclaimer.

(21) Appl. No.: 11/256,491

(22) Filed: Oct. 22, 2005

(65) Prior Publication Data

US 2006/0041758 A1    Feb. 23, 2006

Related U.S. Application Data

(63) Continuation of application No. 09/640,122, filed on Aug. 16, 2000, now Pat. No. 6,959,389.

(51) Int. Cl.
*H04L 9/00* (2006.01)
*G09G 5/00* (2006.01)

(52) U.S. Cl. ............................. 713/183; 345/4; 345/7; 713/182; 713/184

(58) Field of Classification Search .................... None
See application file for complete search history.

(56) References Cited

U.S. PATENT DOCUMENTS

| | | | |
|---|---|---|---|
| 4,479,112 A | 10/1984 | Hirsch | |
| 5,222,135 A | 6/1993 | Hardy et al. | |
| 5,245,319 A * | 9/1993 | Kilian | 345/9 |
| 5,321,750 A * | 6/1994 | Nadan | 380/230 |
| 5,548,647 A | 8/1996 | Naik et al. | |
| 5,614,920 A | 3/1997 | Coteus et al. | |
| 5,719,560 A | 2/1998 | Watkins | |
| 5,787,154 A | 7/1998 | Hazra et al. | |
| 5,892,828 A | 4/1999 | Perlman | |
| 6,529,209 B1 | 3/2003 | Dunn et al. | |
| 6,597,328 B1 | 7/2003 | Stern et al. | |

* cited by examiner

*Primary Examiner*—Pramila Parthasarathy
(74) *Attorney, Agent, or Firm*—Akerman Senterfitt

(57) ABSTRACT

A method for secure entry of a user-identifier in a publicly positioned device can include establishing a private communications link between a user and the publicly positioned device; dividing the user-identifier into at least two portions; separately prompting the user for each portion of the user-identifier; prompting the user for a combination of random data and the user-identifier; and, discarding the random data from the combination. In the preferred embodiments, the publicly positioned device can have a visual interface through which the user can be visually prompted for the random data and the user-identifier. Alternatively, the publicly positioned device can have a telephone interface through which the user can be audibly prompted for the random data and the user-identifier. In the case of a visual display, the private communications link can be established by linking the publicly positioned device to active glasses having a shuttered display. The opening and closing of the shuttered display can be synchronized with the display of the prompts in the visual interface such that only the wearer of the active glasses can view the prompts. In the case of a telephone interface, an telephone operator system, for example an Interactive Voice Response system or a human operator, can provide the prompts audibly through the telephone interface.

7 Claims, 7 Drawing Sheets

Initial SynchronizationPattern

Data Transmission Pattern

SECURE ENTRY OF A USER-IDENTIFIER IN A PUBLICLY POSITIONED DEVICE

CROSS REFERENCE TO RELATED APPLICATIONS

This application is a continuation of, and accordingly claims the benefit of, U.S. patent application Ser. No. 09/640,122 filed in the U.S. Patent and Trademark Office on Aug. 16, 2000.

BACKGROUND OF THE INVENTION

1. Technical Field

This invention relates to the field of user authentication and more particularly to a method and apparatus for secure entry of a user-identifier in a publicly positioned device.

2. Description of the Related Art

In today's environment, it is common for users to interact with machines which require that the user identify themselves in some unique way. For example, telephone carriers require that users enter calling card numbers. More particularly, often the user of a telephone calling card can be required to key in an identifier, for instance, a Personal Identification Number ("PIN"). Similarly, to authenticate the identity of a user, banking Automatic Teller Machines ("ATMs") require that the user provide an ATM or credit card to a card reader in addition to separately keying in a PIN. Finally, like ATMs and telephone kiosks, before granting a user access to sensitive information stored within a computer or workstation, the computer or workstation can require the user to authenticate the user's identity using a personal identification method.

Still, the very nature of the services provided by ATMs, telephone booths and the like require that they be located in public places. Telephone kiosks at airports, public Internet terminals in libraries and Internet cafes, as well as ATM machines on the sidewalk in front of a building are three common examples. Additionally, like ATMs and telephone kiosks, often computers and workstations used to access sensitive information can be located in public places, for example on a user's lap in an airplane, on a train, or on a table in a library.

Various security systems have been developed to address the need for privacy of data in public places. Well known in the industry, these devices most commonly include password protected telephones, ATM machines, computers and computer programs. Additionally, systems have been developed that "lock" a computer or other such device until a valid identification card has been provided to a security card reader. Still, even with these known security methods, it remains an easy task for a would-be unwanted observer to view a password as a legitimate user provides the same to the ATM, telephone kiosk, secure computer or workstation. In particular, if a would-be PIN thief has an awareness of the general sequence of prompts provided to a user by a personal identification method, the would-be thief can visually identify the user's secretive pin number from a distance by merely observing the timing, order and manner in which a user keys in numbers in a numeric keypad, for example. That is, although the PIN number may not be echoed to a screen, by observing the keystrokes of the user, the PIN number can become compromised. Likewise, a would-be thief can audibly identify the user's secretive PIN number from a distance by listening to the sequence of numbers spoken by the user through a telephone receiver, for example. By simply waiting, the would-be thief, in many cases can guess correctly which string of keystrokes or spoken data represent the PIN.

Notably, the more public the location of the computer or workstation, the easier it becomes for an unwanted observer to view the legitimate user's password. Also, it has become commonplace for password pirates to fraudulently reproduce identification cards used to access secure devices. Thus, groups such as the banking, on-line computing and telephone industry have been plagued by stolen access codes and PINs, many of which are observed by trained thieves stationed proximate to the publicly positioned device, for example airport phone terminals.

SUMMARY OF THE INVENTION

In many instances, it is desirable for a user to interact with a machine which performs user authentication. Specifically, often such machines require a user to perform an access validation method, typically by providing to the machine a password, PIN or other such user-identifier. The present invention provides an apparatus and methodology for shielding knowledge of the user-identifier from unauthorized users. In particular, the present invention can be applied to screen-based or telephone-based systems of interaction such as ATM machines, telephone kiosks and computer terminals.

A method for secure entry of a user-identifier in a publicly positioned device through a personal identification method in a computing device can include establishing a private communications link between a user and the publicly positioned device; prompting the user for a combination of random data and the user-identifier; and, discarding the random data from the combination. In one embodiment of the invention, the prompting step can include separately prompting the user for random data and the user-identifier; and, combining the random data and the user-identifier into the combination. Preferably, however, the prompting step can include dividing the user-identifier into at least two portions; separately prompting the user for each portion of the user-identifier; prompting the user for random data in between the separate prompts for the at least two portions; and, discarding the random data and combining the at least two portions. In this case, the user-identifier is a combination of the at least two portions.

In the preferred embodiments, the publicly positioned device can have a visual interface through which the user can be visually prompted for the random data and the user-identifier. Alternatively, the publicly positioned device can have a telephone interface through which the user can be audibly prompted for the random data and the user-identifier. In the case of a telephone interface, the establishing step can include connecting the user to a telephone operator system through the telephone interface. Preferably, the telephone operator system can be an interactive voice response ("IVR") system. Alternatively, however, the telephone operator system can be a human telephone operator. In either case, the prompts can be audibly provided by the telephone operator system to the user through the telephone interface.

By comparison, in the case of a visual interface, the establishing step can include linking the publicly positioned device through an encoder application to active glasses having a shuttered display, the shuttered display opening and closing responsive to synchronization pulses; synchronizing display of the prompts in the visual interface with the opening and closing of the shuttered display in the active glasses; and, displaying masking data in the visual interface between the display of the prompts.

More particularly, the synchronizing step can include generating a sequencing pattern containing synchronization pulses; generating a data signal, the data signal comprising private data and masking data frames interspersed according to the sequencing pattern, the private data comprising the prompts; providing the data signal to the visual interface; and, opening and closing the shuttered display in the active glasses in accordance with the sequencing pattern. In consequence, the user viewing the visual interface with the active glasses can view the prompts and unauthorized viewers without the active glasses can view only the prompts obscured by the masking data.

In one embodiment of the invention, the step of generating a data signal can include inserting masking data in the data signal; and, inserting the private data in the data signal when indicated by the synchronization pulses in the sequencing pattern. In another embodiment of the invention, the step of generating a data signal can include inserting masking data in the data signal; and, for private data forming a complete character or image, repeatedly inserting portions of the complete character or image when indicated by the synchronization pulses in the sequencing pattern until all portions of the complete character or image are inserted in the data signal. As a result, display of the data signal, as viewed by the active glasses synchronized with the display according to the sequencing pattern, is a strobed display of the complete character or image.

Notably, the step of opening and closing the shuttered display can occur responsive to synchronization pulses in the sequencing pattern. In yet another embodiment of the present invention, the sequencing pattern can be encoded. Accordingly, the step of opening and closing the shuttered display can include the steps of decoding the encoded sequencing pattern and, responsive to the synchronization pulses in the sequencing pattern, opening and closing the shuttered display.

In yet another embodiment of the present invention, the sequencing pattern can correspond to alternating displays of the private data and the masking data. Alternatively, the sequencing pattern can correspond to combined left eye/right eye images of the private data. Finally, the masking data can be a fill pattern.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

In order to provide enhanced security to users of computing devices which incorporate personal identification methods, the present invention includes an apparatus and methodology for shielding knowledge of a user-identifier from unauthorized users. In particular, the present invention can be applied both to screen-based or telephone-based systems of interaction such as ATM machines, telephone kiosks and computer terminals. In the case of a screen-based device, the system can combine active glasses decoding technology and prompts for randomly selected data in order to mask the entry of a user identifier which would be otherwise publicly viewable in the absence of the present invention. In the case of a telephone-based system, the system can combine interactive voice response ("IVR") technology and audible prompts for randomly selected data to mask the entry of a user-identifier which would be otherwise publicly viewable in the absence of the present invention.

Figure 1:
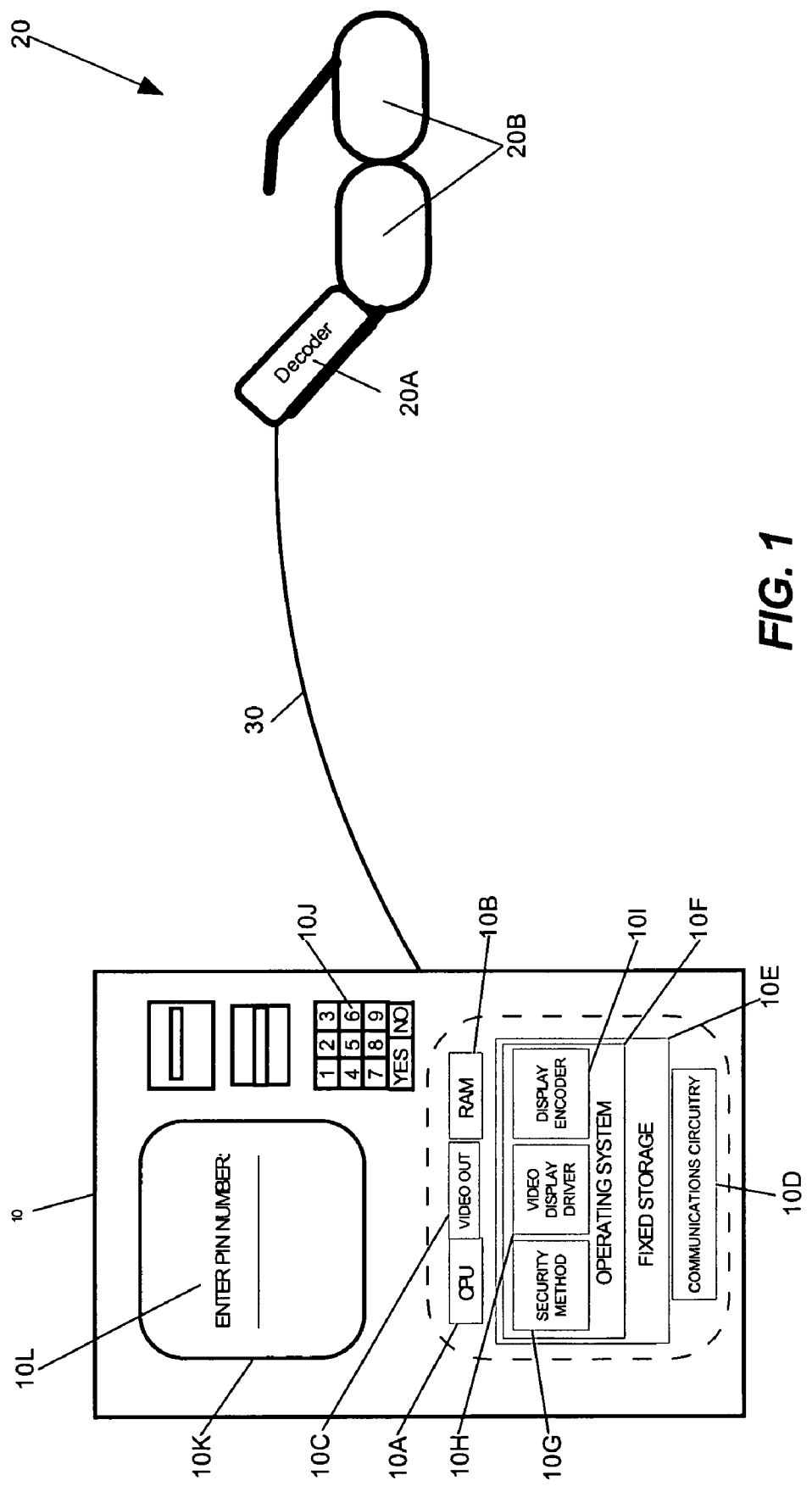
FIG. 1 is an illustration of a publicly positioned device having a visual interface through which the user can interact with a personal identification method in a computing device in accordance with the inventive arrangements.

FIG. 1 is a high level diagram illustrating the case of a screen-based system in which a visual interface is provided, such as a banking ATM machine. In the case of a visual interface, active glasses are used to decode a scrambled display screen so that only the wearer of the active glasses can view messages displayed on the display screen. A secure system in accordance with the inventive arrangements can include a set of active glasses, a publicly positioned device, such as an ATM, which can contain a computing device which can perform a personal identification method, and a data communications link between the active glasses and the ATM.

As shown in FIG. 1, an exemplary system can include a publicly positioned device, for example an ATM 10, having a display 10K and input means, for instance a numeric keypad 10J. This system can also include active glasses 20 having therein a shuttered display 20B, and a communications link 30 connecting the ATM 10 to the active glasses 20. Although the figure indicates a wire-based communications link, the invention is not limited in this regard. Rather, the communications link 30 can include wireless solutions as well, for example an RF or infrared link. Additionally, although FIG. 1 indicates that the active glasses 20 include a shuttered display 20B, the invention is not to be limited to shuttered lenses. Rather, equivalents to shuttered lenses are also contemplated by the present invention, for example lenses incorporating LCD technology, TFT technology, and lens polarization technology.

The ATM 10 can further include therein a CPU 10A, a computer readable memory 10B, for example RAM, video output circuitry 10C for driving both the video display 10K and the active glasses 20, and communications circuitry 10D for communicatively connecting the ATM 10 to other computing devices in a data communications network. The ATM 10 also can include a fixed storage 10E, for example a hard disk drive. The fixed storage 10E can store therein an operating system 10F and a personal communications method 10G for performing user authentication. The fixed storage 10E can also include a video display driver 10H for commanding the video output circuitry 10C, and a display encoder 10I for coordinating the synchronous operation of the video display 10L and the shuttered display 20B of the active glasses 20.

Notably, the display encoder 10I can provide a display signal to the video circuitry 10C which can contain private data interspersed among masking data so that unauthorized viewers who plainly view the video display 10K without the benefit of the active glasses 20 cannot observe the private data. Additionally, the display encoder 10I can embed in the display signal synchronization pulses, which when decoded by the active glasses 20, can enable the active glasses 20 to view the private data. Thus, a display decoder 20A can be included with the active glasses 20 in order to decode the synchronization pulses contained in the data signal received from the video output circuitry 10C in order to display privately the private data in the public video display 10K through the shuttered display 20B of the active glasses 20. Finally, a security method 10G, for example a method for authenticating a personal identification number ("PIN"), can be provided in a computer program with which a user can interact through a security method visual user interface 10L.

Figure 3:
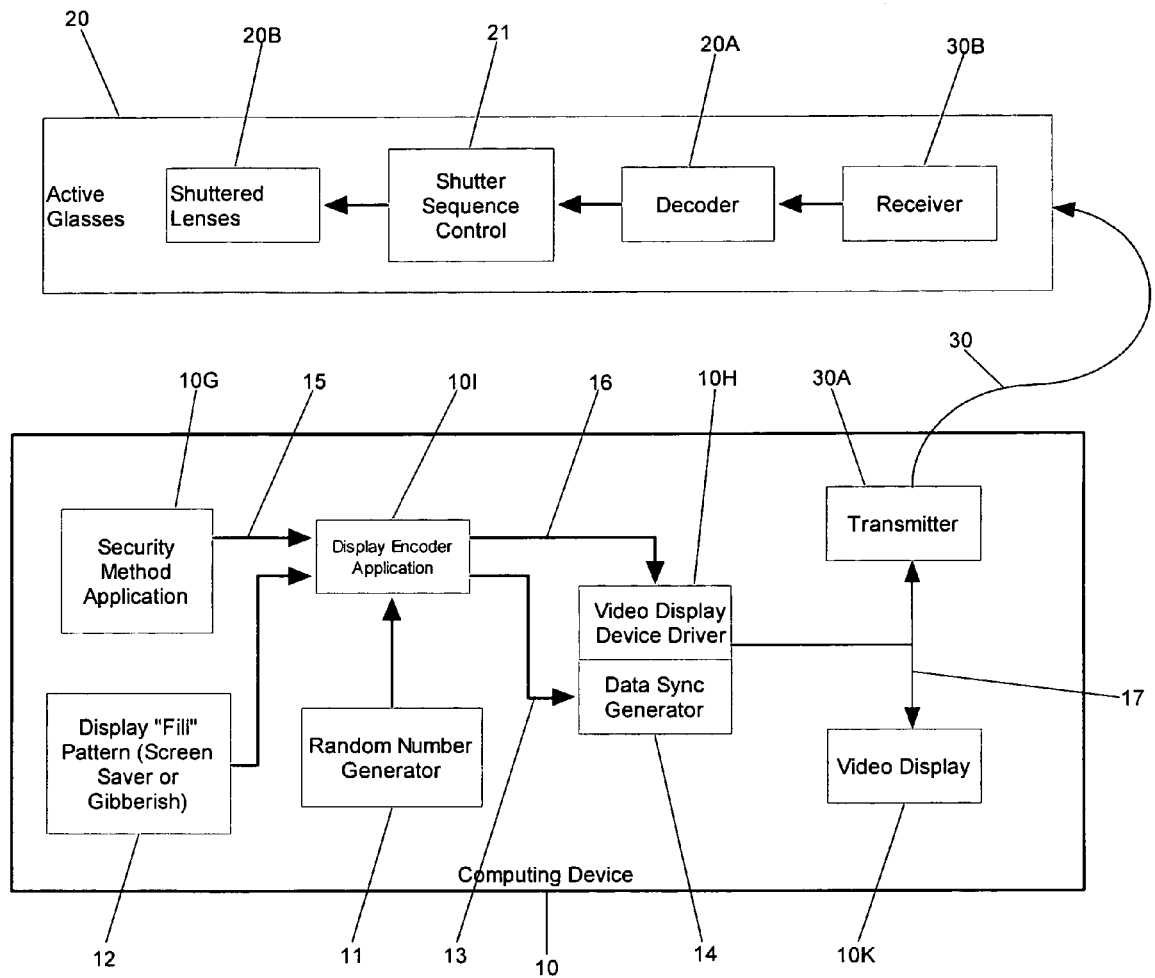
FIG. 3 is a schematic diagram illustrating the relationship between the computing device and the active glasses, both of FIG. 1, both configured in accordance with the inventive arrangements.

The operation of the active glasses 20 in accordance with the inventive arrangements is shown diagramatically in FIG. 3. In the present invention, the active glasses 20 contain electro-optical elements typically found in active glasses, for example shuttered display 20B. Specifically, a shutter sequence control 21 can control the sequencing of the shutters in the shuttered display 20B. In addition, as discussed above, the active glasses 20 can include a decoder 20A for decoding encoded sequencing data transmitted by the computing device 10 and received by the active glasses 20 in receiver 30B across data communications link 30.

In traditional 3D applications, each individual shutter of a shuttered display can be opened and closed in an alternating manner. The only variable, if any, associated with the opening and closing of the shutters is the sequencing rate. In a preferred embodiment of the present invention, in addition to sequencing rate considerations, the decoder 20A can be used to synchronize the shutters of the shuttered display 20B of the active glasses 20 to a specific sequence pattern. In particular, the shutters of the shuttered display 20B can be driven in a pattern that matches the pattern used to change the images in the video display 10K attached to the computing device 10.

In operation, the video display 10K and the active glasses 20 are driven in synchronous operation by a specific pattern, creating in effect, a "strobe window" where only a portion of each character or graphic in the video display 10K are displayed for one or the other of the user's eyes. At the next strobe, one or the other eye is presented with another portion of the character or graphic. After several strobes, an entire character or graphic in the display will have been reproduced. The number of strobes required can be dependent on the number of portions or sub-characters used to develop an entire character on the display.

Figure 6A:
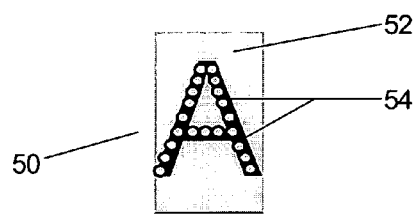
FIGS. 6A-6B, taken together, are illustrations of the formation and display of a character using strobing techniques.
Figure 6B:
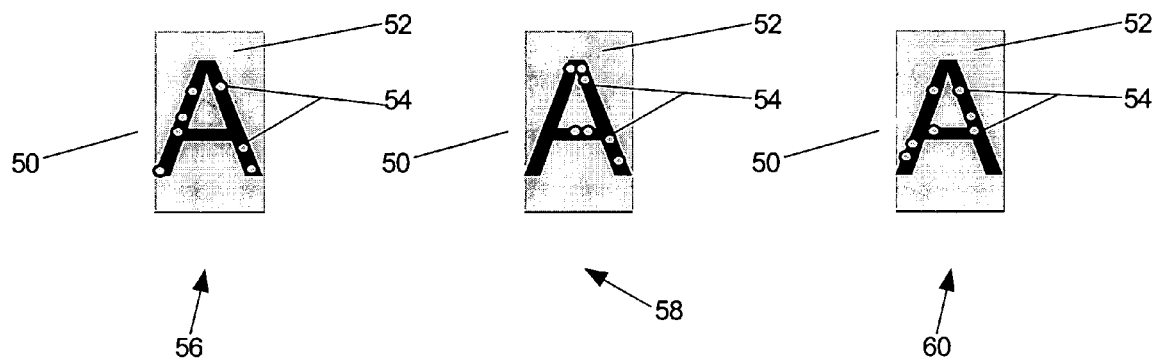

FIGS. 6A and 6B, taken together, illustrate an exemplary character formed using the above-described strobing technique. FIG. 6A illustrates a typical character display mechanism used in commercially available displays, well-known in the art. Each character in the display can be defined by a plurality of pixels 54 illuminated in a display. The pixels 54 are logically grouped into a character cell 50, and within that cell, a smaller character box 52. The intersections of the pixels 54 on an x-y axis of the character box 52 represent the possible locations of pixels 54 to illuminate for this character. Graphics can be described in the same manner, except the "boxes" are larger. In FIG. 6A, the character "A" is shown as it is "constructed" over the course of three "strobes" shown in FIG. 6B as described above. Notwithstanding, the pattern, as shown in FIG. 6B is merely an exemplary pattern. In fact, other combinations of pixels 54 could be chosen so long as a complete character can be formed subsequent to the completion of the sequencing pattern.

Advantageously, during each strobe, data unrelated to the private data can be displayed in the display screen so that non-authorized users can observe only public data. For example, a screen-saver pattern can be employed as the unrelated public data. In particular, referring now to FIG. 3, the security method application can provide standard video output 15 to the display encoder 10I as it normally would in a computing device unmodified for the present invention. If enabled, the present invention can also generate a fill pattern 12 to create a public view for viewing by unauthorized viewers lacking the synchronized active glasses 20. Each of the standard video output 15 and the fill pattern 12 can be provided to the encoder application 10I.

In order to synchronize the video display 10K with the active glasses 20, the preferred embodiment can incorporate at least two sequencing patterns. One sequencing pattern simply opens or closes the shuttered lenses of the active glasses 20 concurrently, and synchronously alternates the display between two different states. The first state can include the private data intended for the user. The second image can include masking data, for example, a different screen, a screen saver, or the original image offset by some physical distance. For example, the image can be shifted one or more characters left or right, or shifted one or more lines up or down. If the screen is refreshed every 10 ms, the time between refresh points remains available for other sequences to be initiated so that other users on other machines in the same proximity can have their own private data views enabled. The latter method can prove useful for moderate levels of privacy and security.

A second sequencing pattern can include a specific combination of left eye/right eye images that can permit only the user to see each character on the screen. This second sequencing pattern can be more complex than the first sequencing pattern since the timing of the sequencing pattern and the sequencing of each left eye/right eye image can be variable. Nevertheless, in either case, without the specific sequencing information, the projected images will be unreadable to unauthorized users. Significantly, the projected images can be unreadable to unauthorized user having active glasses but lacking knowledge of the specific sequencing information.

In order to coordinate the specific sequencing of the display with the alternating action of the active glasses 20, the encoding application 10I can be employed. The encoding application 10I, which implements a sequencing pattern encoding algorithm, preferably incorporates a random number as a seed for the encoding algorithm. The encoding algorithm can set the display device driver 10H and active glasses shutter sequence control 21 to a corresponding sequencing pattern. Advantageously, any popular encoding algorithm can be used in the sequencing pattern, so long as the algorithm can produce flicker-free operation.

Specifically, a set of guidelines exists for presenting different images in each eye while minimizing perceived flicker and eyestrain. Typical implementations employ a 120 Hz refresh rate, or as close to 120 Hz as possible according to the associated display's capability. However, because there are a number of monitors incapable of accommodating a 120 Hz refresh rate, a refresh rate adjustment utility can be provided to adjust and test the refresh rate setting whenever either a user selects a new resolution or connects a different display to the computer.

For example, at higher resolutions—i.e. 1024×768 and greater—a 100 Hz or 105 Hz refresh rate can accommodate a wide variety of displays that may not have a video bandwidth capable of coping with a 120 Hz refresh rate. Still, when the refresh rate falls below 120 Hz, the alternating pattern can become increasingly more noticeable. In particular, as the refresh rate falls below 90 Hz, flicker can become more apparent and may be problematic for some users. In contrast, for refresh rates above 90 Hz, flicker can be noticeable but not objectionable. Hence, refresh rates falling below 90 Hz preferably are avoided.

In order to properly synchronize the video display 10K and the active glasses 20 in a secure manner, a random cycle time between strobe cycles can be chosen and inserted into the synchronization signal. In order to encode a synchronization signal with a random cycle time, the encoder application 10I can obtain a seed from random number generator 11 in order to create a random cycle time for use in synchronizing the video display 10K and the active glasses 20. Specifically, as discussed in further detail herein, the seed can provide a foundation for delaying the display of privately viewable data in a subsequent strobe cycle, in between which the fill pattern will be inserted, and a public view therefore displayed.

The encoder application 10I can generate a display signal 16 having the fill pattern 12 and interspersed therein according to the sequencing pattern of the synchronization signal, private data included in the standard video output 15. Concurrently, the encoder application 10I can generate a data sync signal 13 for synchronizing the active glasses 20 with the video display 10K. The video display device driver 10H can receive the display signal 16 while a data sync generator 14 can receive the data sync signal 13.

Initially, the video display device driver 10H, using the data sync generator 14, can initialize the active glasses 20 by transmitting through transmitter 30A, an initialization sync signal (not shown) to the active glasses 20. Subsequently, the video display device driver 10H can pass the data sync signal 13 to the active glasses 20 and the combined signal 17 to the video display 10K. By synchronizing the action of the shuttered display 20B using the data sync signal 13, the user can view only the portions of private data shown during the strobe (e.g. unmasked) cycles. The visual persistence of the user's eyes can integrate the strobed portions of private data into a unified, privately viewed image, secure from viewing by unauthorized users. Hence, the active glasses 20 can provide the user a private view of the data simultaneously to which an unauthorized viewer can see only the public pattern composed of the fill pattern 12 combined with the private view on the video display 10K.

Figure 7A:
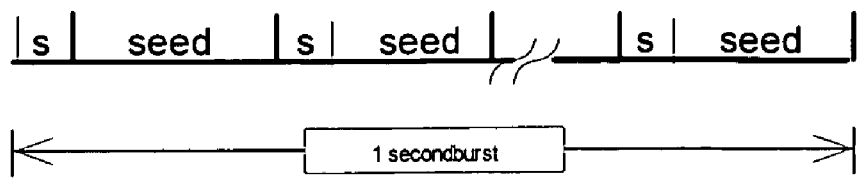
FIGS. 7A and 7B illustrate initialization synchronization and data transmission patterns used to synchronize the active glasses with the visual display of the publicly positioned device of FIG. 1.
Figure 7B:
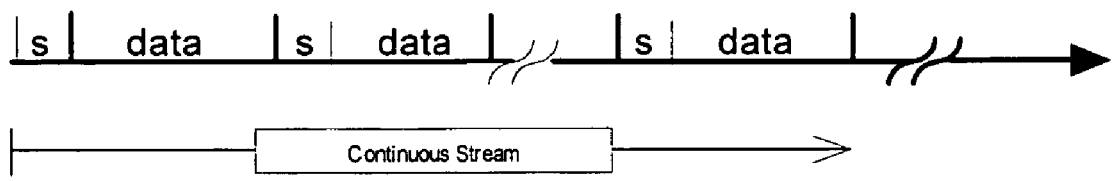

FIGS. 7A and 7B illustrate communications protocols which can be used for communications between the computing device 10 and the active glasses 20. One skilled in the art will recognize however, that the protocols described herein are only exemplary of many protocols that could be equally and operatively employed. The important aspects of any protocol include the support for the initial synchronization of the computing device 10 and active glasses 20 with the random seed, and the support for the transmission of the continuing synchronization between the computing device 10 and the active glasses 20. Specifically, in the preferred embodiment, a user having a data communications link 30, preferably wireless, between the computing device 10 and the active glasses 20 can turn away from the video display 10K, lose a communications connection across the data communications link 30, turn back to the video display 10K and regain the communications connection. In addition, the continuing synchronization can eliminate the need for the active glasses 20 to maintain an accurate timer during the sequencing operation.

As shown in FIGS. 7A and 7B, the preferred embodiment can include two protocols, an initialization protocol and a data transmission protocol. As shown in FIG. 7A, the initialization protocol can initialize the active glasses 20 using the same seed used by the computing device 10 to encode the shutter sequence in a data sync signal 13. Notably, as discussed above, the data sync signal 13 is merely an encoded shutter sequence and not the standard video output 15. Rather, video output 15 can be combined with the fill pattern 12 and thereby hidden on the video display 10K. The active glasses 20 can be initialized by a short burst, preferably one second or less, that transmits a data sync pattern for establishing communications between the computing device 10 and the active glasses 20, and the seed pattern itself. Notably, as is well known in the art of data communications, the data sync pattern can be any pattern based on the error characteristics of the data communications link.

As shown in FIG. 7A, the initialization protocol preferably can be broadcast as a burst in order to prevent other proximate receivers from receiving and decoding the seed pattern. Still, the user preferably can add additional security by ensuring that no other active glasses in the area are being initialized at the same time. In the case of an infrared data communications link, the user can simply shield the transmitter and receiver path with the user's hand for the duration of the burst. Alternatively, in the case of an RF link, a serial number can be stored in a fixed memory in the active glasses 2. In consequence, the encoding application can use the serial number as part of the seed pattern so that only corresponding active glasses can decode the seed pattern.

FIG. 7B also illustrates a data transmission protocol. The data transmission protocol, like the initialization protocol, can include a broadcast of a data sync pattern and a data pattern. The data sync pattern may be the same or different than the initialization sync pattern. In fact, the data sync pattern can be eliminated if an encoding pattern, for example NRZ or NRZI, is used in the data communications link to denote timing data to be extracted by the active glasses. Still, since the data pattern is an encoded shutter synchronization pattern for the active glasses 20 to decode and apply, in incorporating a data sync pattern it is possible to further enhance security.

For example, notably each data pattern can differ so the shutter sequence can be continuously varied. The decoder 20A residing on the active glasses 20 simply can apply the new synchronization pattern, decoded in each data sync frame. Further security can be incorporated by varying the durations of each data sync frame. As a result, in broadcasting several synchronization patterns of differing length between each data sync, the active glasses decoder 20A can still extract the synchronization pattern as a continuous stream of left eye/right eye shutter actions.

Figure 4:
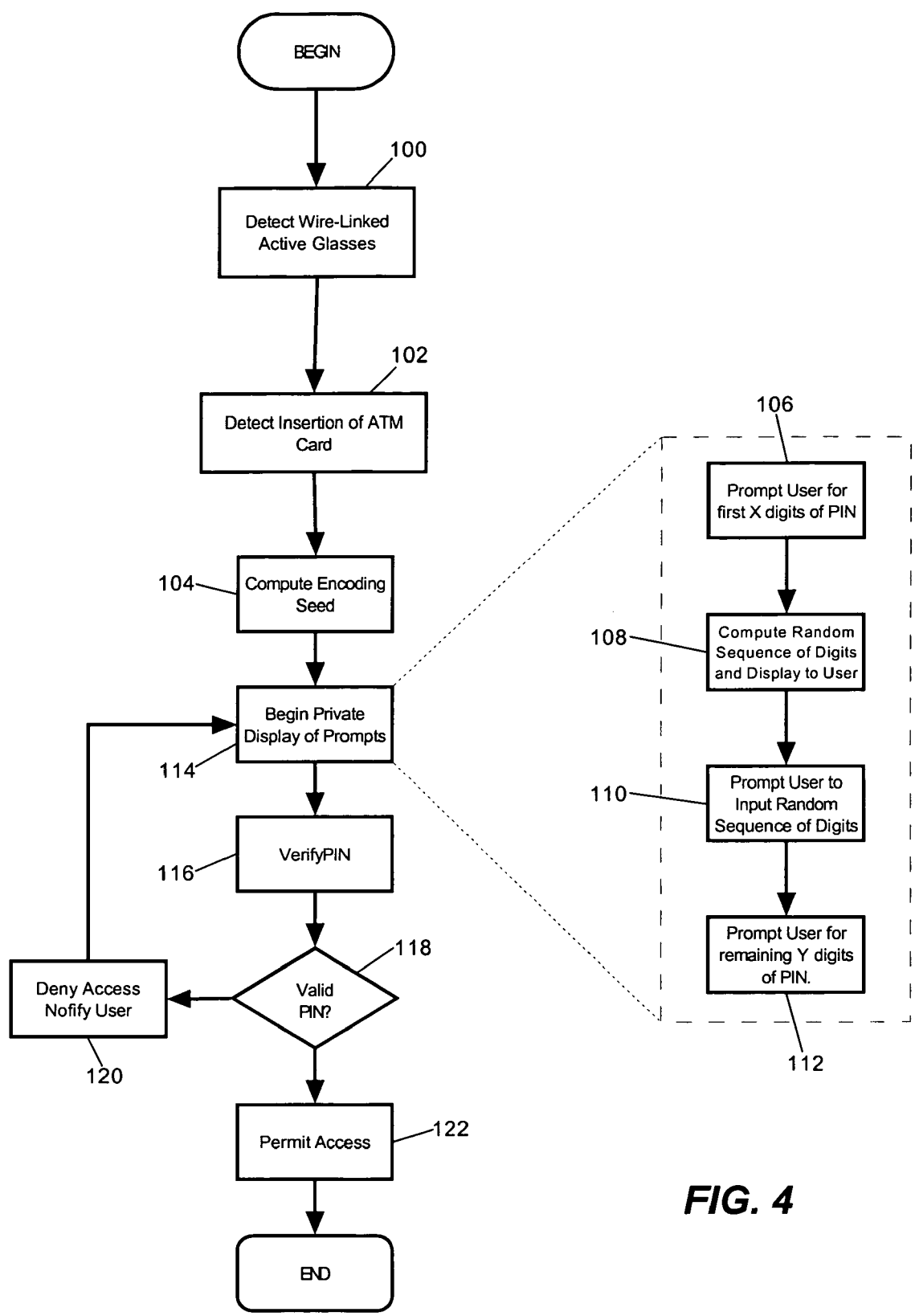
FIG. 4 is a flow chart illustrating a preferred method for secure entry of a user-identifier in a publicly positioned device having a visual interface.

FIG. 4 is a flow chart illustrating a method for secure entry of a user-identifier in a publicly positioned device wherein the device has a visual interface through which the user can interact with a personal identification method in a computing device. As shown in FIG. 4, the publicly positioned device is assumed to be an ATM for use with wire-linked active glasses. Notwithstanding, the invention is limited neither to the ATM nor the wire-linked active glasses. Rather, the publicly positioned device can be a computer having a visual display, for example. Additionally, the active glasses can be wirelessly bound to the device.

Using the ATM with wire-linked glasses example, the user can attach the active glasses to the ATM by inserting a suitable active glasses connector to a suitable connector receptacle in the ATM. In step 100, the insertion of the active glasses can be detected. Subsequently, the user can insert or swipe an ATM card through an ATM magnetic card reader. In step 102, the ATM can detect the insertion of the ATM card. Subsequently, in step 104, the ATM machine can transmit to the active glasses an encoding seed based on the users account number which can be read from the storage on the ATM card, for example a magnetic strip or bar code. Alternatively, the active glasses can contain a pre-programmed seed based on a password selection so that the active glasses can be matched immediately. Once the opening and closing of the shuttered lenses in the active glasses have been synchronized with the display of private data in the video display of the ATM machine, the transfer of private data can commence.

In particular, in step 114, the user can interact with the personal identification method through a series of prompts. Specifically, in step 106, the ATM can prompt the user for the first X digits of the user's PIN. The value X can be any value consonant with the length of the PIN. For example, for a six digit PIN, X can be any number less than six. Likewise, for a ten digit PIN, X can be any number less than ten. Subsequently, in step 108, the ATM can compute a random number using random number generation techniques well known in the art. Significantly, the length of the random number, itself can be random. Once a random number has been computed, the user can be prompted to key in the random number in step 110. Finally, the user can be prompted to supply the remaining portion of Y digits of the user's PIN in step 112. However, the invention is not limited to merely the bifurcation of a PIN into X and Y portions. Rather, the method of the invention can be extended to any number of portions so long as the number of prompts for PIN portions does not exceed the number of digits in the PIN and so long as at least one randomly generated value is interspersed among the PIN portions.

More generally, these described steps apply with respect to any set of symbols. As used herein the term symbol encompasses digits and other numbers as well as letters and other characters. Other characters include, for example, familiar keystroke symbols such as "–", "*", and "#". Moreover, it is to be understood that any combination of different classes of symbols—alphanumeric and otherwise—can be used for personal identification and, accordingly, are amenable to processing and handling according to the steps described herein.

In step 116, the ATM can extract the random data from the series of portions of the PIN. In addition, the ATM can combine each portion of the PIN to form the complete PIN. In step 118, the ATM can determine whether the PIN is valid for the user as identified by the ATM card. If the ATM fails to validate the PIN, the user can be notified in step 120 and the user can be given an opportunity to repeat the entry of the PIN. Otherwise, in step 122, the user can be granted access to the ATM.

In the preferred embodiment, the ATM can simultaneously display a screen prompting the user both to enter the user's PIN in addition to prompting the user for randomly generated data. For example, assuming the PIN number 1234, the ATM can privately display to a user wearing active glasses, "Enter the first two digits of your PIN, followed by '765', followed by the last 2 digits of your PIN". Once the user has entered each portion of the PIN and the random number '765', the ATM can discard the random number leaving the original PIN 1234. Notably, only the user wearing matching active glasses can see the screen display to know the value of the random number and the sequence in which to insert the random number. Unauthorized observers can observe merely 1276534 being entered, and will remain unable to determine which portion of the sequence is the actual PIN.

Figure 2:
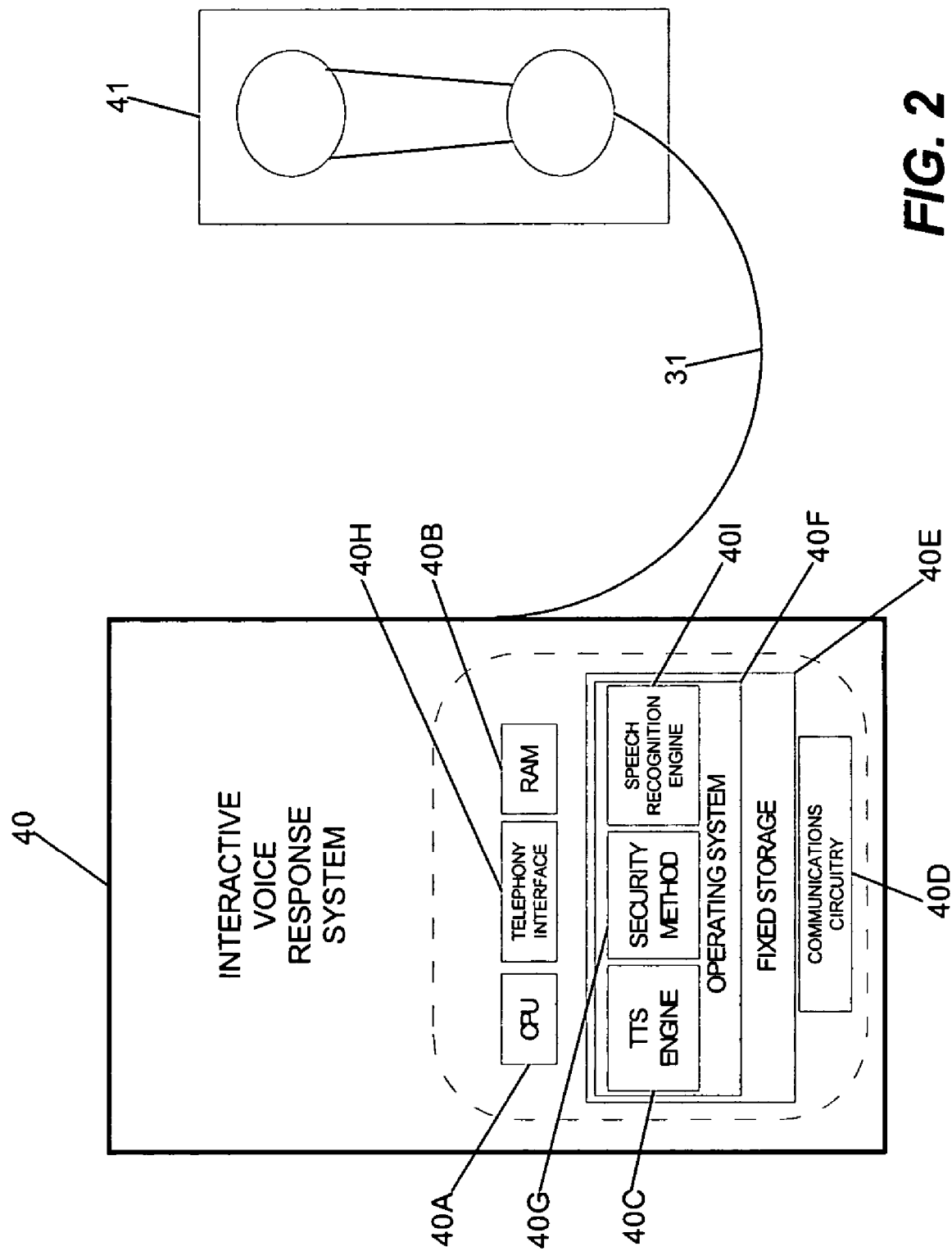
FIG. 2 is an illustration of a publicly positioned device having a telephone interface through which the user can interact with a personal identification method in a computing device in accordance with the inventive arrangements.

As noted above, the method of the invention can also be performed in a publicly positioned computing having a telephone interface rather than a visual interface. FIG. 2 is a high level diagram illustrating the case of a telephone-based system in which a telephone interface is provided, such as an IVR system, for facilitating the placement of a calling card telephone call or for facilitating telephonic access to on-line information. In the case of a telephone interface, a user can establish a communications link privately with the IVR system (or any suitable telephone operator system) through a private telephone link. In this case, a secure system in accordance with the inventive arrangements can include a publicly positioned device, such as a telephone kiosk, an IVR system which can contain a computer program for performing a personal identification method, and a telephonic communications link between the telephone kiosk and the IVR system. Notably, a human operator can be substituted for the IVR system in which case the human operator can provide the necessary audible prompts to a user of the secure system.

As shown in FIG. 2, an exemplary system can include a publicly positioned computing device, for example a telephone kiosk 41 and an IVR system 40. The telephone kiosk 41 can be communicatively connected to the IVR over communications link 31. Notably, the communications link 31 can be a traditional POTS link, a wireless communications link, for example an RF link, or any other suitable link through which telephony can occur. The IVR system 40 can further include therein a CPU 40A, a computer readable memory 40B, for example RAM, a telephony interface 40H for establishing and maintaining a telephonic connection across the communications link 31 with the telephone kiosk 41, and communications circuitry 40D for communicatively connecting the IVR system 40 to other computing devices in a data communications network. The IVR system 40 also can include a fixed storage 40E, for example a hard disk drive. The fixed storage 40E can store therein an operating system 40F and a personal identification method for performing user authentication, referred to in FIG. 2 as security method 40G. The fixed storage 40E also can include a text to speech ("TTS") engine for converting computer produced text to audible speech, and a speech recognition engine 40I for converting speech provided through the telephony interface 40H into computer readable text.

Figure 5:
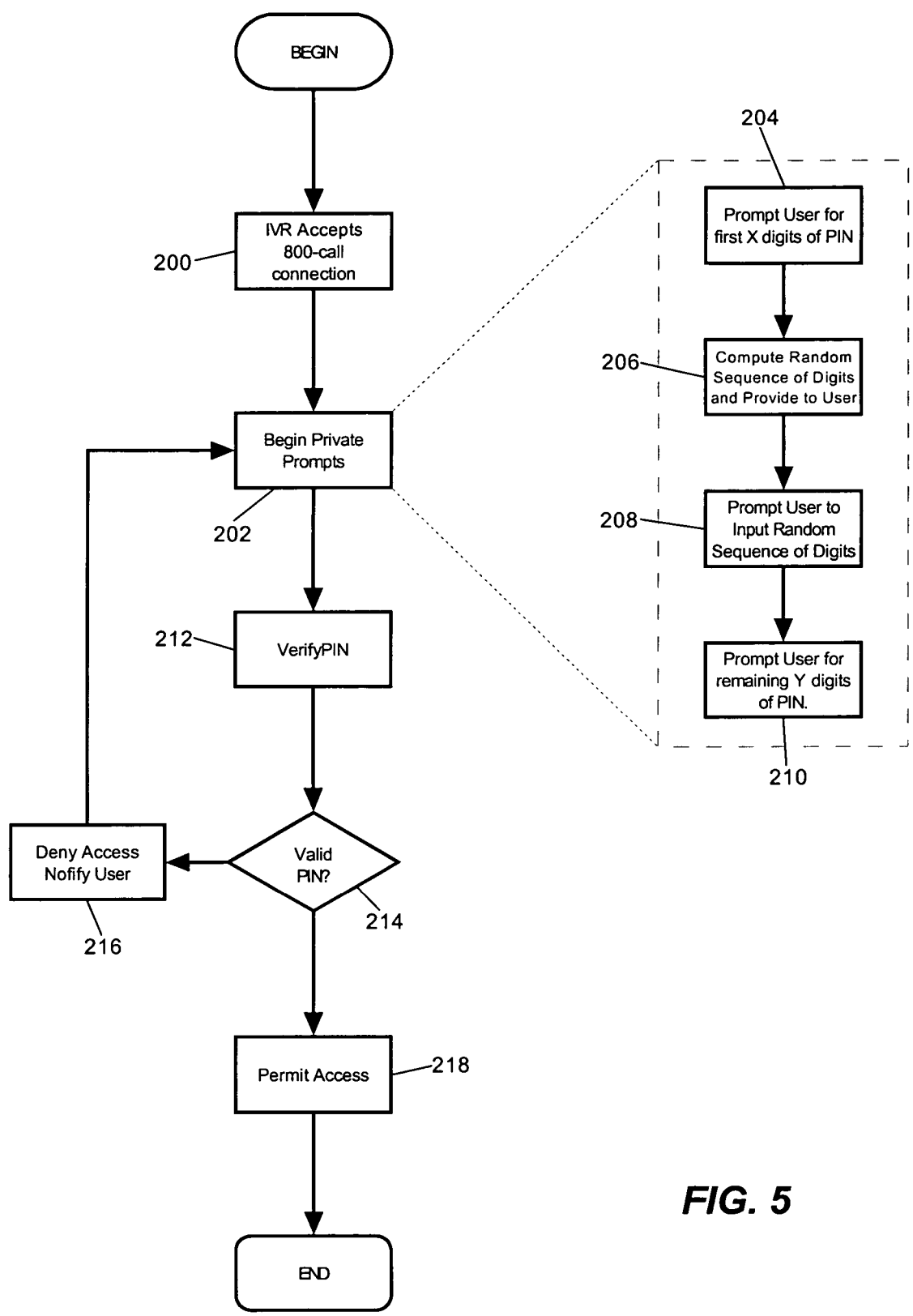
FIG. 5 is a flow chart illustrating a preferred method for secure entry of a user-identifier in a publicly positioned device having a telephone interface.

FIG. 5 is a flow chart illustrating a method for secure entry of a user-identifier in a personal identification method in a publicly positioned device wherein the device has a telephone interface through which the user can audibly interact with the personal identification method. As shown in FIG. 5, the publicly positioned device is assumed to be a telephone kiosk for connection with a telephone operator system for instance an IVR system or a human operator. Notwithstanding, the invention is limited neither to the telephone kiosk nor the telephone operator system. Rather, the publicly positioned device can be a cellular telephone or an RF radio with an in-ear receiver, for example. Additionally, the telephone kiosk can audibly communicate with any suitable substitute for an IVR or a human telephone operator, for instance a computer having a telephony interface.

Beginning in step 200 the user can establish a private connection to an IVR system by dialing a phone number suitable for connecting the user to a telephony interface in the IVR system through a telephone kiosk. The IVR system can receive the telephone call from the user. Subsequently, in step 202, the user can interact with the personal identification method through a series of prompts. Specifically, in step 204, the IVR system can prompt the user for the first X digits of the user's PIN. As before, the value X can be any value consonant with the length of the PIN. Subsequently, in step 206, the IVR system can compute a random number using random number generation techniques well known in the art. Significantly, the length of the random number itself can be random.

Once a random number has been computed, the user can be prompted to key in the random number in step 208. Finally, the user can be prompted to supply the remaining portion of Y digits of the user's PIN in step 210. However, as before, the invention is not limited to merely the bifurcation of a PIN into X and Y portions. Rather, the method of the invention can be extended to any number of portions so long as the number of prompts for PIN portions does not exceed the number of digits in the PIN and so long as at least one randomly generated value is interspersed among the PIN portions.

In step 212, the IVR system can extract the random data from the series of portions of the PIN. In addition, the IVR system can combine each portion of the PIN to form the complete PIN. In step 214, the IVR system can determine whether the PIN is a valid PIN. If the IVR system fails to validate the PIN, the user can be notified in step 216 and the user can be given an opportunity to repeat the entry of the PIN. Otherwise, in step 218, the IVR system can grant the user access to target services.

As an example, the method of the invention can be applied to the use of calling cards to access telephone service on telephones. In the preferred method of the invention, the user first dials the access number. Subsequently, the user's telephone call can be answered by a telephone operator system. While the telephone operator system can include an IVR machine for providing automated prompts to the user, the invention is not so limited and the telephone operator system could include a human telephone operator for providing verbal prompts to the user. In any case, the user can be prompted to first "enter the called number". Having entered the called number, the user can be prompted to enter a first portion of the calling card number. A second prompt asks the user to enter a specified random number. The third prompt requests the user to enter the remainder of the calling card number. As before, the sequence can be modified to allow more than one random number insertion sequence, as well as varying random number lengths.

For a typical fourteen digit calling card, where the digit fields are three digits, three digits, four digits, four digits, an example could be:

enter the first two digits of your calling card number;
enter the number 463 (randomly selected and spoken by the IVR system);
enter the last twelve digits of your calling card number.

Many other combinations are possible using the same methodology. The carrier knows the random number used for this specific call, removes it form the total digit string collected, and the remaining numbers are the original calling card number. An observer, even knowing the digit field layout (3,3,4,4) would not be able to extract a useable number from observing the keyed sequence. For even greater security each call can use a different random number, random length of inserted number, and a different (random) placement of the inserted sequence.

Thus, the present invention provides an apparatus and methodology for shielding knowledge of a user-identifier (be it a PIN, calling card number or other user-identifier) from unauthorized viewers. In particular, the present invention can be applied both to screen-based or telephone-based systems of interaction such as ATM machines, telephone kiosks and computer terminals. In the case of a screen-based device, the system can combine active glasses decoding technology and prompts for randomly selected data in order to mask the entry of a user identifier which would be otherwise publicly viewable in the absence of the present invention. In the case of a telephone-based system, the system can combine interactive voice response ("IVR") technology and prompts for randomly selected data to mask the entry of a user-identifier which would be otherwise publicly viewable in the absence of the present invention.

Notably, the method of the invention can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods. A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

We claim:

1. A computer-implemented method for providing authorizing data comprising the steps of:
    identifying a device configured to receive a set of authorizing symbols through an input interface, wherein the input interface is in a publicly viewable location;
    the device prompting for an initial number "n" of symbols from the set of authorizing symbols, where "n" is less than total number of symbols contained within the set of authorizing symbols;
    receiving the prompted for "n" symbols through said input pad;
    the device prompting for a number "m" of symbols, wherein the "m" symbols are not symbols of the set of authorizing symbols;
    receiving the prompted for "m" symbols through said input pad;
    the device prompting for a number "o" of symbols of the set of authorizing symbols;
    receiving the prompted for "o" symbols through said input pad;
    the device combining the "n" symbols and the "o" symbols to form an authorizing input, wherein the "m" symbols are not used to form the authorizing input; and
    authorizing a user based upon whether the authorizing input is equivalent to previously established authorizing data.

2. The method of claim 1, wherein the device is a public-access device having a visual interface, and wherein the prompting steps comprise providing visual prompts with the visual interface.

3. The method of claim 1, wherein the device is a public-access telephone providing an audio interface, and wherein the prompting steps comprise providing audible prompts with the audio interface.

4. The method of claim 1, wherein the device is a public-access telephone having a keypad, and wherein the steps of receiving comprise receiving data supplied by a user using the keypad.

5. The method according to claim 1, further comprising generating the "m" symbols randomly.

6. The method of claim 5, further comprising supplying randomly generated "m" symbols to the user before the step of prompting for the "m" symbols.

7. The method of claim 5, wherein the step of generating comprises generating the "m" symbols using a random number generator.

* * * * *